United States Patent
Thacker

(10) Patent No.: US 6,473,943 B1
(45) Date of Patent: Nov. 5, 2002

(54) HOSE CLAMP

(75) Inventor: James C. Thacker, Ocala, FL (US)

(73) Assignee: Dayco Products, Inc., Miamisburg, OH (US)

( * ) Notice: Subject to any disclaimer, the term of this patent is extended or adjusted under 35 U.S.C. 154(b) by 0 days.

(21) Appl. No.: 09/652,631

(22) Filed: Aug. 31, 2000

(51) Int. Cl.⁷ .......................... B65D 63/02; F16L 33/02
(52) U.S. Cl. ................ 24/20 R; 24/20 TT; 24/20 EE
(58) Field of Search ................ 285/23; 24/20 R, 24/20 EE, 20 S, 20 TT

(56) References Cited

U.S. PATENT DOCUMENTS

| | | | |
|---|---|---|---|
| 4,483,556 A | * 11/1984 | LiVolsi | ............. 285/252 |
| 4,882,814 A | 11/1989 | Takahashi | |
| 5,115,541 A | * 5/1992 | Stichel | ............. 24/20 R |
| 5,414,905 A | * 5/1995 | Kimura et al. | .......... 24/20 R |
| 5,620,209 A | 4/1997 | Sauer | |
| 5,675,871 A | 10/1997 | Webb et al. | |
| 5,706,557 A | 1/1998 | Beicht | |
| 5,864,926 A | * 2/1999 | Gyongyosi et al. | ......... 24/20 R |
| 5,996,186 A | 12/1999 | Yamada et al. | |

FOREIGN PATENT DOCUMENTS

GB         977757     * 12/1964  ............. 24/20 CW

* cited by examiner

*Primary Examiner*—Lynne H. Browne
*Assistant Examiner*—Giovanna M. Collins
(74) *Attorney, Agent, or Firm*—Joseph V. Tassone

(57) ABSTRACT

A hose clamp having overlapping ends with radially outwardly extending tabs. A first tab has an integral stop member engaging the second tab so that they are spaced in the radially unstressed position. The second tab has locking members engaged by the first tab in radially stressed position to retain this position when the hose is subjected to internal stress forces.

20 Claims, 1 Drawing Sheet

HOSE CLAMP

BACKGROUND THE INVENTION

1. Field of the Invention

The present invention relates to a circular spring band hose clamp for clamping a hose end onto a member such as a connecting pipe.

2. Prior Art Statement

The use of circular spring band hose clamps is well known in the art, wherein overlapping ends have outwardly extending members which are squeezed together to enlarge the band diameter for easy placement around the hose; then allowing the members to separate so that the band will tightly engage the outer surface of the hose. Such a clamp is disclosed, for example in U.S. Pat. No. 4,882,814 (Takahashi); U.S. Pat. No. 5,620,209 (Sauer); U.S. Pat. No. 5,675,871 (Webb et al.); and U.S. Pat. No. 5,996,186 (Yamada et al.).

An improved device is disclosed in U.S. Pat. No. 5,706,557, issued to Beicht, which further provides for one end of the band to engage the other end when the clamp expands under internal pressure and thus prevent further expansion of the band.

SUMMARY OF THE INVENTION

This invention also provides a hose clamp having a generally circular spring band with a clamping portion and opposite ends which overlap each other, the ends having outwardly extending tabs which may be held so that the clamp is radially unstressed and can be loosely place around the hose end. When the taps are released, the band tightly envelops the hose and contacts the outer surface; in the same manner as the prior art. However, as in the above-mentioned Beicht patent, the ends are adapted to inter-engage so that the clamp expands and holds this position even when internal stresses are applied to the hose, and further expansion of the band cannot occur. The novel clamp structure herein provides several features that perform the desired function in a superior manner. The outwardly extending tabs are spaced from each other at an angular distance of about 30 degrees when the band is in unstressed condition, this being accomplished by utilizing a stop member integral with the first tab, this stop member engaging the second tap. then when the squeezing force on the tabs is released, the band contracts radially until the stop member engages a selected one of the parallel series of locking members located on the clamping portion of the band which is adjacent to the second end. The selected locking member is one which provides the smallest possible diameter of the clamp in the radially stressed position. By locking the ends together, no further expansion of the band and clamp is permitted, despite increased internal forces on the hose.

It is a principal object of this invention, therefore, to provide a hose clamp comprising a spring band having two ends which interlock in a stressed position.

It is a further object to prevent said clamp from expanding under increased stress forces within the clamped hose.

It is another object to enable the clamp to reach an optimum locking position under stressed conditions.

These and other objects and advantages of the present invention will become apparent in the following specification and accompanying drawings.

DESCRIPTION OF PREFERRED EMBODIMENTS

Figure 1:
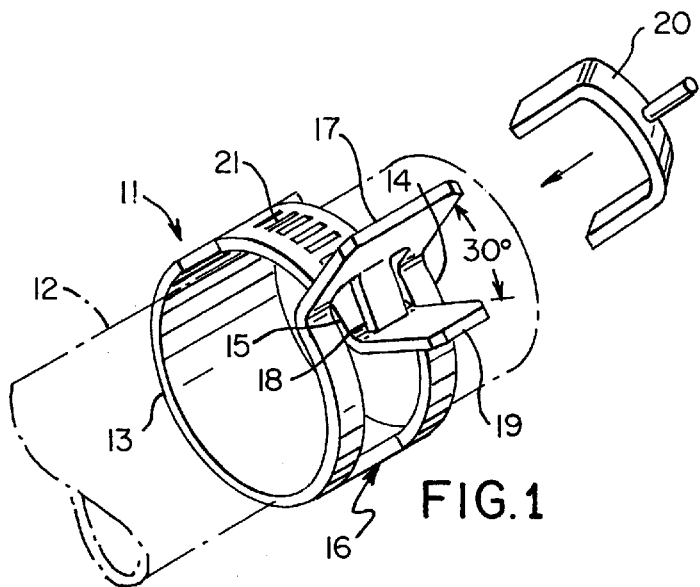
FIG. 1 is a perspective view of the novel hose clamp with the clamp in unstressed position, with the hose shown in phantom.
Figure 2:
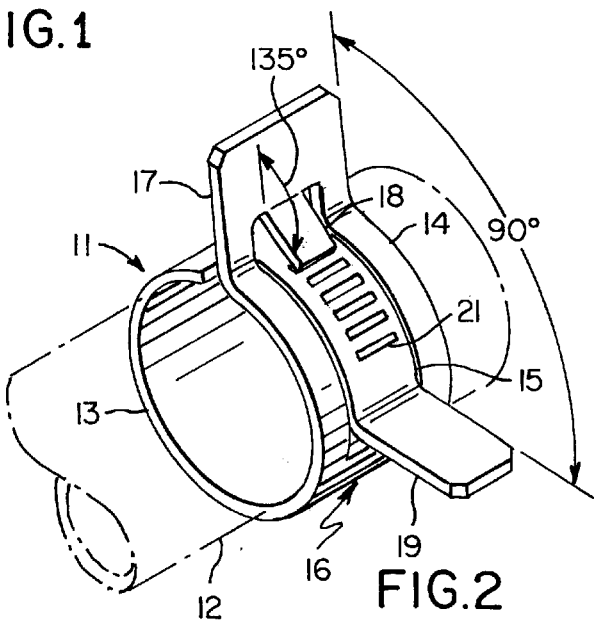
FIG. 2 is a view similar to FIG. 1 with the clamp in stressed position.

Referring now to the drawings, FIGS. 1 and 2 illustrate a preferred form of the novel spring band clamp 11 mounted on a typical hose 12 (shown in phantom). The clamp has a principal clamping portion 13 and first and second ends 14 and 15 which overlap each other in the same plane. This is accomplished by providing a slot or opening 16 in the portion 13 which is adjacent the first end 14 into which second end 15 extends. The clamp is formed of a spring steel material of the type referred to in the prior art devices referred to above, and will exert radial pressure upon the hose being clamped when the clamp is in radially stressed position. The term "radially stressed" refers to the condition of the clamp when no effort is made to force the ends toward each other by any external forces other than external radial pressure of the hose upon the clamp. This condition is illustrated in FIG. 2. The opposite position of the clamp is "radially unstressed", which refers to the condition wherein the ends are forced together under external forces so that the clamp has a larger diameter than in the radially stressed condition and will fit loosely around the outer surface of the hose. This position is shown in FIG. 1. The first end 14 has a radially outwardly extending tab 17 at approximately right angles to the end. The tab 17 has an integral stop member 18 extending inwardly therefrom at an angle of approximately 135 degrees, having a function described below. The second end 15 has a similar tab 19 also extending at about right angles to the end. In the radially unstressed position of FIG. 1, the stop member 18 engages the surface of tab 19 when the tabs are squeezed toward each other, and held in place by use of fingers or by use of an external tool 20, which is shown in exploded position. The tabs 17 and 19 are squeezed together using a hand tool or other special equipment. At this position the tabs are spaced about 30 degrees apart. In this position the clamp is placed loosely around the hose by slipping it over the end thereof, but may be glued or taped in place, if desired.

A plurality of parallel slots 21 are formed transversely through the clamping portion 13 adjacent the end 15, and serve as locking members. These are used in conjunction with stop member 18 to achieve the radially stressed position of FIG. 2, in the following manner. The retaining force shown in FIG. 1 is released after the clamp is positioned around the hose such as by removing the tool 20. This allows the clamp to be forced radially inward due to the inherent forces of the spring band, the end 15 moving into slot 16, and the clamp then reaches the smallest possible closed diameter which the hose diameter will allow. The stop member 18 engages the locking member 21 which is thus automatically selected. At this position the tabs are spaced approximately 90 degrees apart. The inter-engagement of the member 18 and 21 will maintain constant optimum clamping action regardless of increased internal forces in the hose.

MODIFICATION

Figure 4:
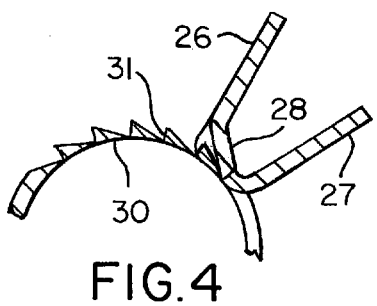
FIG. 4 is a section taken along lines 4—4 of FIG. 3.
Figure 3:
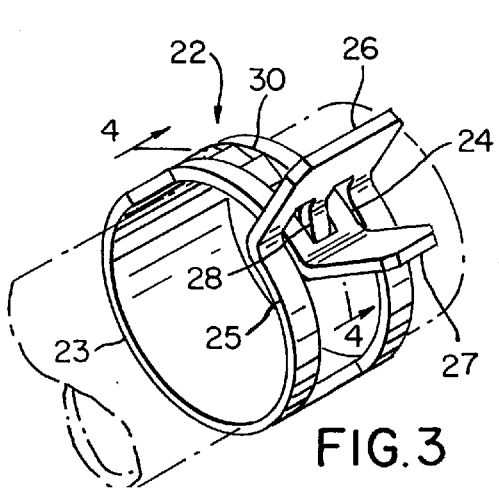
FIG. 3 is a view similar to FIG. 1 illustrating a modified form of the invention.
Figure 5:
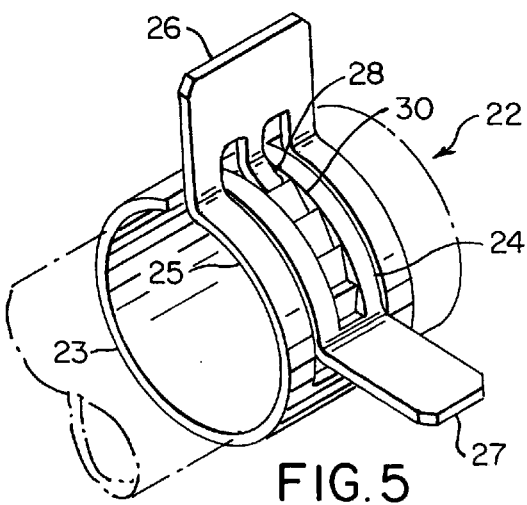
FIG. 5 is a view similar to FIG. 2, showing the modified clamp.

FIG. 3 illustrates a modified form of the invention comprising a clamp 22 which is similar to clamp 11 except for the formation of the locking arrangement. The clamp 22, also shown in radially unstressed position, comprises a principal clamping portion 23 and ends 24 and 25, having outwardly extending tabs 26 and 27 similar to tabs 17 and 19. However the stop member 28, which is an integral part of tab 26, has a curved end configuration. The locking members 30 are not formed of a series of slots such as slots 21 of clamp 11, but instead are formed of a series of transversely extending shoulders 31, into which curved end of the stop member 28 is engaged as best shown in FIG. 4. When the retaining force on tabs 26 and 27 are released, the stop member 28 is freed to engage the appropriate locking member 30 in the same manner as in the radially unstressed position. The radially stressed position is shown FIG. 5 similar to the showing of FIG. 2.

The above embodiments are exemplary. Other forms of clamps are within the scope of the invention.

What is claimed is:

1. A clamp for a hose having inner and outer surfaces, comprising a generally circular spring band having a clamping portion and first and second ends in overlapping relation, each of said ends having radially outwardly extending corresponding first and second tabs, a plurality of circumferentially aligned locking members located on said clamping portion adjacent said second end, said tabs being forced toward each other by external forces to position said clamping portion loosely around said outer surface of said hose to create a radially unstressed condition of said clamp, said first tab having an integral stop member engaging said, second tab and causing said first and second tabs to be spaced from each other in said radially unstressed condition of said clamp, said tabs allowed to become spaced further apart from each other upon release of said external forces to allow said clamping member to be forced radially inward and contact said outer surface of said hose and create a radially stressed condition of said clamp and exert radial pressure on said hose, said stop member further engaging a selected one of said locking members corresponding to the diameter of said clamp upon contact with said outer hose surface in said radially stressed condition to retain said clamp in said radially stressed condition when said hose is subjected to increased stress forces.

2. The clamp of claim 1 wherein said locking members comprise parallel slots extending through said clamping portion transversely thereof.

3. The clamp of claim 1 wherein said locking members comprising parallel shoulders on the outer surface of said clamping portion transversely thereof.

4. The clamp of claim 3 wherein said stop member comprises an end configured to engage said shoulders.

5. The clamp of claim 1 wherein said tabs are spaced apart at an angle of approximately 30 degrees in unstressed position.

6. The clamp of claim 1 wherein said tabs are spaced apart at an angle of approximately 90 degrees in stressed position.

7. The clamp of claim 1 wherein said stop member extends from said first tab at an angle of approximately 135 degrees.

8. The clamp of claim 1 further comprising retaining means adapted to lock said tabs in close proximity for maintaining said unstressed position.

9. The clamp of claim 1 wherein said inter-engagement of said stop member and said selected locking member prevents further radial expansion of said clamp in radially stressed position.

10. The clamp of claim 1 wherein said selected locking member position provides for the smallest possible diameter of said clamp on said radially stressed position.

11. In a clamp for a hose having inner and outer surfaces, comprising a generally circular spring band having a clamping portion and first and second ends in overlapping relation, each of said ends having radially outwardly extending corresponding first and second tabs; the method of clamping said hose comprising the steps of forming a plurality of circumferentially aligned locking members in said clamping portion adjacent said second end, forcing said tabs toward each other by external forces to position said clamping portion loosely around said outer surface said hose to create a radially unstressed condition of said clamp while retaining said tabs in spaced relation, forming an integral stop member on said first tab and engaging said stop member against said second tab to place said tabs in spaced relation in said radially unstressed condition, releasing said external forces to release said tabs from their retaining position to space said tabs further apart to allow said clamping portion to be forced radially inward and contact said outer surface of said hose, creating a radially stressed condition of said clamp to exert radial pressure on said hose to cause said stop member to engage a selected one of said locking members corresponding to the diameter of said clamp upon contact with said outer hose surface to retain said clamp in said radially stressed condition to engage and grip the outer surface of said hose even when said hose is subjected to increased stress forces.

12. The method of claim 11 comprising the step of forming said locking members of parallel slots extending through said clamping portion transversely thereof.

13. The method of claim 11 comprising the step of forming said locking members of parallel shoulders on said clamping portion transversely thereof.

14. The method of claim 13 comprising the step of configuring said stop member to engage said shoulders.

15. The method of claim 14 comprising the step of forming said stop member of a curved configuration.

16. The method of claim 11 comprising the step of spacing said tabs apart at an angle of approximately 30 degrees in unstressed position.

17. The method of claim 11 comprising the steps of spacing said tabs apart at an angle of approximately 90 degrees in stressed position.

18. The method of claim 11 comprising the step of forming said stop member approximately 135 degrees from said first tab.

19. The method of claim 11 comprising the step of placing separate retaining means on said tabs to maintain said unstressed position.

20. The method of claim 11 comprising the step of utilizing said inter-engagement of said stop member and said selected one of said locking members to prevent further radial expansion of said clamp in said radially stressed position.

* * * * *